E. V. HARTFORD.
SHOCK ABSORBER.
APPLICATION FILED NOV. 2, 1914.
1,343,970.
Patented June 22, 1920.
2 SHEETS—SHEET 2.
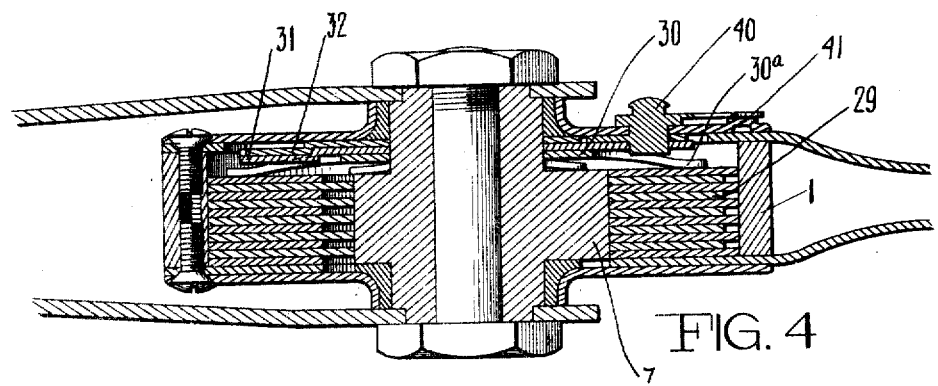
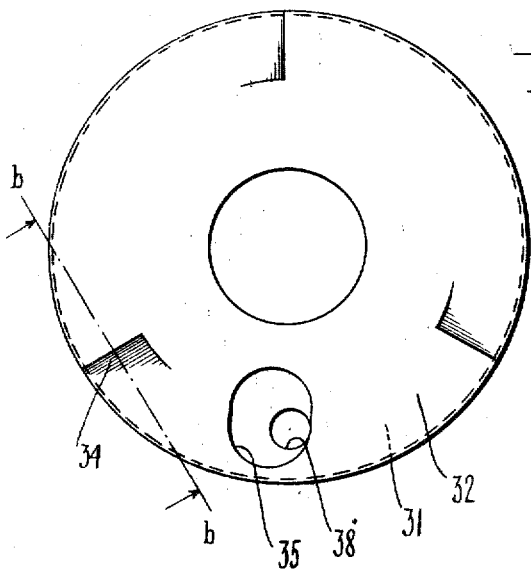
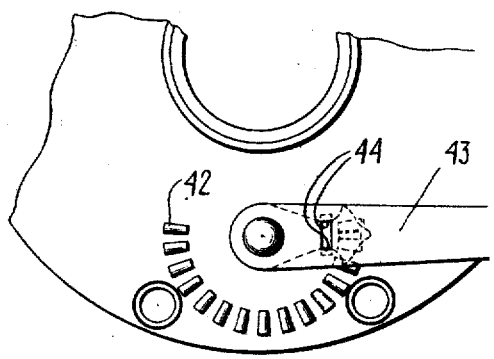
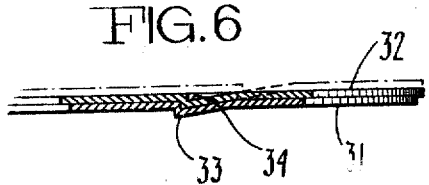
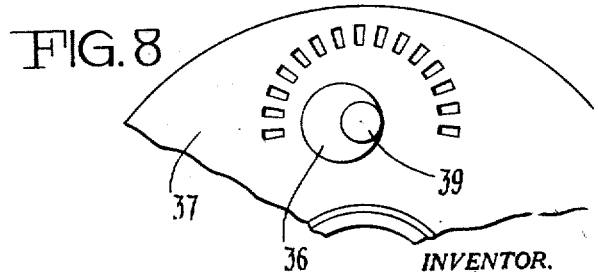
WITNESSES:
Arthur Choquet
Wm. C. Dunn
INVENTOR.
Edward V. Hartford,
BY
ATTORNEYS.

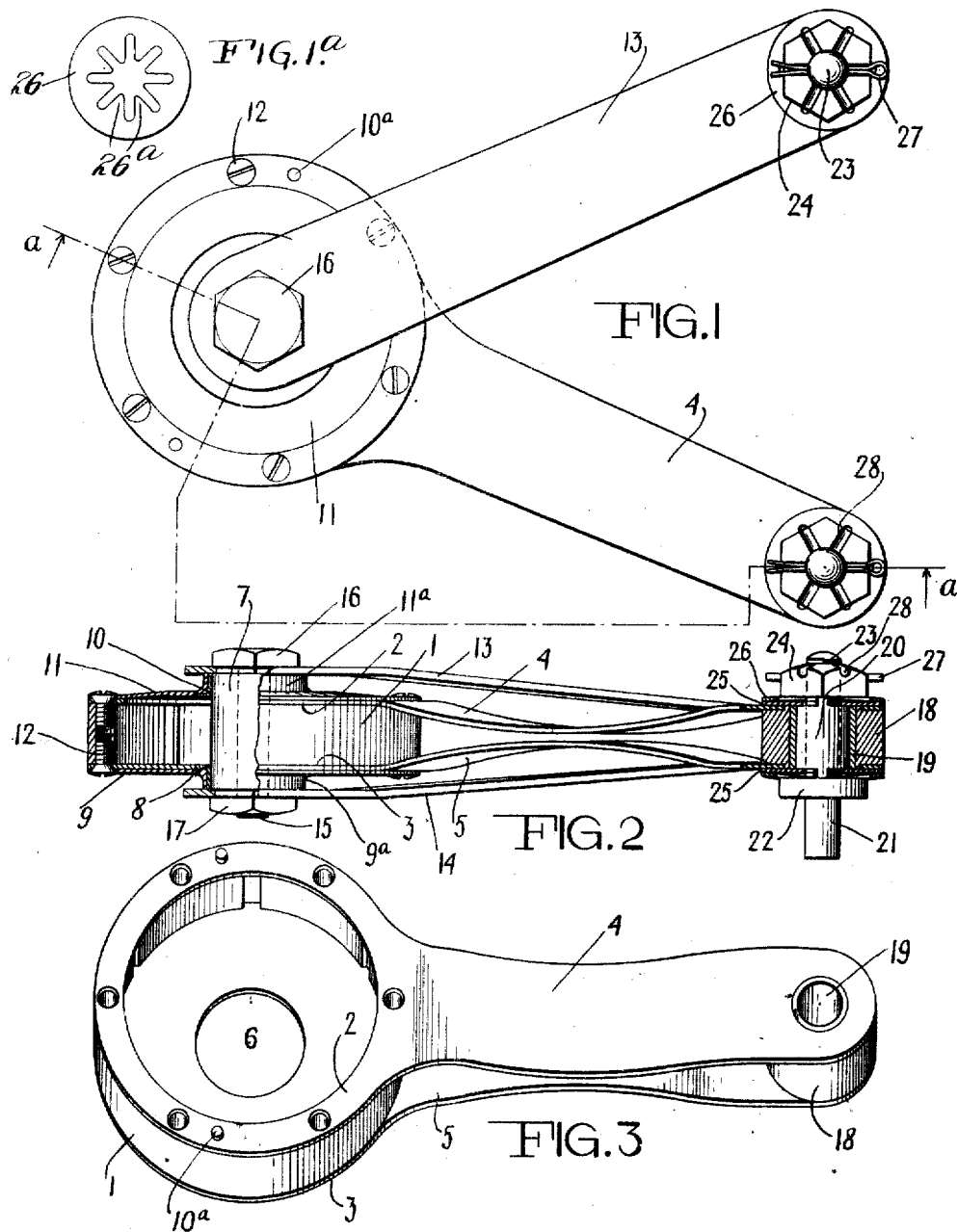

UNITED STATES PATENT OFFICE.

EDWARD V. HARTFORD, OF DEAL, NEW JERSEY.

SHOCK-ABSORBER.

1,343,970.　　　Specification of Letters Patent.　　Patented June 22, 1920.

Application filed November 2, 1914. Serial No. 869,881.

*To all whom it may concern:*

Be it known that I, EDWARD V. HARTFORD, a citizen of the United States, residing at Deal, in the county of Monmouth and State of New Jersey, have invented certain new and useful Improvements in Shock-Absorbers for Spring-Supported Vehicles, of which the following, taken in connection with the accompanying sheet of drawings, is a full, clear, and concise description thereof.

My invention relates to that type or class of shock absorber, commonly referred to as friction shock absorber, and comprehends more particularly a certain improved water and dustproof housing for the friction retarding elements, supporting arms therefor, and means for mounting the supporting arms of the shock absorber in proper operative position between the movable parts of the vehicle.

My invention furthermore comprehends a certain improved adjusting mechanism for adjusting the tension of the spring which regulates the amount of frictional drag between the friction retarding elements, causing them to move with reluctance when the shock absorber is operated.

Referring to the accompanying drawings:

Figure 1 is a view in side elevation of a shock absorber embodying my invention.

Fig. 1ᵃ is a view of the anti-rattling washer used on the ends of the supporting arms.

Fig. 2 is a top plan view thereof, partly broken away and in section, taken on line *a—a* of Fig. 1.

Fig. 3 is a perspective detail showing the manner in which the housing and its supporting arm, of bifurcated or two-part construction, is made.

Fig. 4 is a vertical cross-sectional view of the shock absorber, showing the friction producing mechanism, the upper arms being broken away and also showing the adjusting means employed for regulating the frictional adherence between the retarding elements.

Fig. 5 is a plan view of the two annular deflecting plates which cause the spring to become tensioned one being shown partly in dotted outline.

Fig. 6 is a cross-sectional view taken on line *b—b* of Fig. 5.

Fig. 7 is an enlarged fragmentary detail of the housing cover showing the adjusting pointer and coöperating key for manipulating the same.

Fig. 8 is a view of same taken from the under-side thereof.

The housing, which retains the retard or drag producing elements, is made up of the following instrumentalities. A cylindrical ring 1, forms a peripheral wall for the shock absorbing elements. Washer-like retaining flanges 2 and 3, and contiguous parts of the inner supporting arm which, as shown, is of bifurcated construction, consisting of stamped parts 4 and 5. The retaining ring 3 is of greater area than the retaining ring 2, being provided with a restricted centered aperture 6 for the reception of the hub 7 and bearing sleeve 8, which is carried by the end cap 9. The other end of the hub 7 finds bearing in an anti-friction sleeve 10, which is carried by the end cap 11. Both end caps 9 and 11 are also of sheet metal formation, being stamped into the configuration illustrated with outwardly extending hub portions 9ᵃ, 11ᵃ, which hub portions serve to separate further the parts of the outer supporting arm. Both end caps are held in assembled relation to the cylindrical wall 1 by means of suitable screws 12. Upon retaining ring 2 are mounted the studs 10ᵃ, which are received within suitable perforations provided in the cap 11 and serve to rigidly hold the two parts from independent movement relatively of each other.

The hub 7 is provided with hexagonal ends. The hub engaging ends of the arm parts 13, 14 are provided with complemental hexagonal cut-out portions, which fit upon said hexagonal ends of the hub, thus forming a positive connection therebetween. To hold the arms against displacement, a bolt 15 is provided, which is received within a central bore through the hub 7. The hexagonal head 16 of this bolt engages the part 13, while the hexagonal nut 17 engages the part 14 of the supporting arm 13, 14 and holds it in proper position. The parts 4 and 5 of the lower supporting arm are constructed or curved inwardly, in order to more readily permit of their being received between the parts 13, 14 of the other supporting arm, these arms being caused to oscillate in scissor fashion during their ordinary operation.

It will be explained that the hub 7 and the housing move relatively to each other, and the friction retarding elements are operably associated in such manner, as to effect the creation of the necessary frictional drag or retarding action when the hub and housing so move under stress during operation.

The supporting arms are connected to the respective parts of the vehicle one to the running gear and the other to the chassis, and their point of connection is of such a construction as to provide against rattle and noise, in short, a positive anti-rattling joint. The end-supporting construction illustrated, is of a new and novel form embodying features which lend greatly to efficiency and economy in construction, as well as in cost of manufacture. The two-end constructions are alike in character, and it is thought the description of one will suffice.

The outer ends of each supporting arm are separated by a hub 18, provided with a friction lining or sleeve 19. The sleeve, hub and arm ends are in rigid connection and move together. These parts are mounted upon a sleeve 20, which, in turn, is mounted and fixed upon a stud 21, provided with a supporting flange or extension 22. The stud 21 is provided with a screw threaded extremity 23, upon which a retaining nut 24 is threaded, after the parts have been assembled and when screwed tight serve to hold them in proper position between it and the supporting flange 22.

In order to secure positively tight anti-rattling joints at these ends, I interpose between the arms ends and the supporting flange 22 and retaining nut 24, washer-like disks 25 of friction metal. Against these disks bear washers 26 of springy metal formed with a series of internal circumferentially arranged fingers 26ª. (See Fig. 1ª). When the parts have been assembled and the retaining nut 24 tightened to the extent where a positive tight joint is obtained, a cotter pin 27 is inserted through the hole drilled in the stud 21, proper channels or grooves 28 in the face of the nut being provided for its reception.

Now referring to Figs. 4 to 8 inclusive I will proceed to describe my improved means for adjusting or regulating the frictional drag between the retarding elements of the shock absorber.

Within the housing and coöperatively associated with the housing 1 and the hub 7 are the superimposed flat annular ring-shaped members 29, which may comprise alternate fiber and metal washer-like plates. These are all held in close association by means of a spider spring 30, which is provided with outwardly-extending fingers 30ª, which fingers bear with tension upon the uppermost friction member, through which the pressure is distributed to the remaining members. Superimposed on this spider spring, and mounted upon the hub 7 are two deflecting plates 31, 32. These plates are provided with complemental projections 33, 34 shaped by suitable stampings from the plates themselves. These projections are shown as being three in number on each plate, but any number may be employed as desired. The plate 32 is provided with an aperture 35 for the accommodation of a cam 36 carried by the inside of the housing cover 37, while the plate 31 is provided with a circular opening 38 for the reception of a pin 39 which is formed integral with the cam 36. The pin 39 and cam 36 are operated from the exterior by means of a head 40, which is located on the outside of the housing. Projecting from this head is a pointer 41 which coöperates with the series of projections 42 which are stamped from the housing cover 37 and are arranged in a series in a dial arrangement. It will be apparent from this, that as the knob 40 is rotated, the pin 39 being lodged in the opening 38 of the deflecting plate 31, the latter will be held stationary, while the upper disk 32 will be caused to move by the engagement of the concentric cam 36 and the opening 35 (see Fig. 6), causing the projection 34 of the deflecting plate 32 to ride up the incline of the complemental projection 33, of the deflecting plate 31, thus causing an increasing pressure to be exerted upon the latter. This pressure, in turn, is transmitted to the spider-shaped spring 30, with which it contacts, and through it to the superimposed closely associated friction retarding elements. By varying this movement, more or less pressure can be exerted upon these elements. In order to make this adjustment readily and conveniently, I preferably use a key 43, which encircles the knob 40 and is provided with a pair of lugs 44 which straddle the contracted or inner portion of the pointer 41.

While I have illustrated one preferred embodiment of my invention, I wish to have it understood that I do not wish to be restricted in matter of details, as the structural arrangement and shape of parts may be changed or altered without departing from the spirit and scope of my invention, as defined by the following claims.

Having thus described my invention what I claim as new herein and desire to secure by Letters Patent is:

1. In a shock absorber for spring supported vehicles, a housing for frictional retarding elements, comprising an annular member, a sheet metal arm of two-part or bifurcated construction, embracing said annular member and mounted thereon, sheet metal inclosing caps for said annular member engaging the ends of said arms and provided with outwardly directed hub portions, a second sheet metal arm of two-part or bifurcated construction, straddling a portion of said first arm and the housing, and means for operably associating the housing and the second arm, so as to permit of their independent relative movement.

2. In a shock absorber for spring supported vehicles, comprising a housing for the retarding elements, said housing including an annular inclosing member and sheet metal end apertured caps, a pair of arms for suspending the shock absorber in proper position relative to the parts of the vehicle, said arms being of two-part or bifurcated construction, one arm being rigidly connected with the annular inclosing member and the other arm being operatively associated with said end caps, and means for holding the arms in proper operative position with respect to each other.

3. In a shock absorber for spring supported vehicles, an annular inclosing member, sheet metal caps mounted upon the ends thereof, sheet metal arms associated with said annular inclosing member and said caps, said arms being of two-part or bifurcated construction and arranged so as to move relatively to each other, and formed to permit one part of one supporting arm to pass between the other of said bifurcated supporting arm.

4. In a shock absorber for spring supported vehicles, the combinatiton with a housing for containing frictional retarding elements, a hub mounted within the housing and adapted to be brought into coöperative relationship with said retarding elements, a sheet metal bifurcated supporting arm having an enlarged portion forming a washer rigidly connected with the housing and a sheet metal bifurcated arm in rigid connection with the hub, said arms adapted during normal operation to move in relatively opposite directions, the members of one of said arms being constricted, so as to permit their passage between the parts of said other bifurcated supporting arm when they have been caused to move toward one another.

5. In a shock absorber for spring supported vehicles, a supporting end adapted to be connected to one part of the vehicle, said end comprising a bearing sleeve provided with a friction lining and having seat portions for the accommodation of a supporting arm of two-part construction, washer-like members of frictional material engaging and bearing with spring tension against said bearing sleeve and a stud provided with adjusting means for putting tension or pressure upon the washers for clamping the respective parts in operative relation.

6. In a shock absorber for spring supported vehicles, a housing for the retarding elements comprising an annular member, a sheet metal arm of two-part or bifurcated construction, one part being provided with a center aperture and forming a base or support for the retarding elements, sheet metal end inclosing caps, engaging said parts, and a sheet metal supporting arm of bifurcated construction engaging said inclosing caps, substantially as described.

7. In a shock absorber for spring supported vehicles, the combination of a plurality of superimposed frictional retarding elements, a spring member for holding said elements in close association under pressure, and manually-operable means for adjusting the pressure of said spring member to a predetermined degree, the pressure of the spring member remaining constant during the functioning of the device when so adjusted, said means comprising a pair of superimposed deflecting plates having complemental parts adapted to coöperate to deflect them upon the rotary movement of one of said plates, and means for causing one of said plates to partially rotate, while the other plate remains stationary.

8. In a shock absorber for spring supported vehicles, the combination of a plurality of superimposed friction retard elements, a spider spring bearing upon and holding said members in close association and under pressure, means for regulating said pressure, said means comprising a pair of coöperating deflecting plates mounted upon the spring, one plate being provided with a cam opening, and the other plate being provided with a circular opening, and both plates being provided with deflecting projections, an inclosing plate carrying a stud provided with a cam coöperating with the cam opening of the first-mentioned deflecting plate, said cam, when moved, adapted to move said first-mentioned deflecting plate rotatively with respect to the other deflecting plate to increase the pressure on the spring.

9. In a shock absorber for spring supported vehicles, the combination of a plurality of closely associated superimposed friction retard elements, a spider spring holding said members in close association and under spring pressure, means for regulating the spring pressure of said spider spring, said means comprising a pair of coöperating deflecting plates, one plate being provided with a cam opening, and the other plate being provided with a circular opening, a cam-carrying stud carried by the inclosing plate provided with a cam coöperating with the cam opening of first-mentioned deflecting plate, said cam, when moved, adapted to move said first-mentioned deflecting plate rotatively with respect to the other deflecting plate, and a key adapted to coöperate with the stud for rotatively moving the same.

10. In a shock absorber for spring supported comprises, the combination of a plurality of superimposed friction elements, a spring member for holding said elements in close association under pressure, and means effective upon said spring for varying the tension thereof and obtaining a predetermined constant pressure between said elements during the functioning of said device, said means comprising a pair of superimposed plates having complemental parts adapted to coöperate to deflect the plates upon the movement of one of said plates.

In witness whereof I have hereunto set my hand in the presence of two subscribing witnesses.

EDWARD V. HARTFORD.

Witnesses:
 ARTHUR WATERMAN,
 ELINOR C. MCCORMACK.